(12) United States Patent
Luo et al.

(10) Patent No.: US 12,722,469 B2
(45) Date of Patent: Sep. 1, 2026

(54) SIMPLE TWO-SIDE FASTENERS FOR VEHICLE BATTERY PACK HOUSINGS

(71) Applicant: FCA US LLC, Auburn Hills, MI (US)

(72) Inventors: Deming Leo Luo, Shanghai (CN); Xingjia Li, Shanghai (CN); Xiu Mi Song, Shanghai (CN); Zi Ye Wang, Shanghai (CN); Junjun Kieran Ji, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 280 days.

(21) Appl. No.: 18/515,844

(22) Filed: Nov. 21, 2023

(65) Prior Publication Data

US 2025/0162394 A1 May 22, 2025

(51) Int. Cl.

| | |
|---|---|
| ***H01M 50/262*** | (2021.01) |
| ***B60K 1/04*** | (2019.01) |
| ***B60L 50/64*** | (2019.01) |
| ***H01M 50/242*** | (2021.01) |
| ***H01M 50/244*** | (2021.01) |
| ***H01M 50/249*** | (2021.01) |

(52) U.S. Cl.

CPC ................ *B60K 1/04* (2013.01); *B60L 50/64* (2019.02); *H01M 50/242* (2021.01); *H01M 50/244* (2021.01); *H01M 50/249* (2021.01)

(58) Field of Classification Search

CPC ........ B60K 1/04; B60L 50/64; H01M 50/242; H01M 50/244; H01M 50/249; H01M 2220/20; H01M 50/262; H01M 50/271; Y02E 60/10

See application file for complete search history.

(56) References Cited

U.S. PATENT DOCUMENTS

| | | | | |
|---|---|---|---|---|
| 9,445,850 | B2 | 9/2016 | Kinmon | |
| 10,581,126 | B2 | 3/2020 | Milton et al. | |
| 10,688,854 | B2 * | 6/2020 | Caliskan | B60K 1/04 |
| 2021/0098761 | A1 * | 4/2021 | Montgomery | H01M 50/249 |
| 2021/0175480 | A1 * | 6/2021 | White | H01M 50/209 |
| 2023/0036105 | A1 * | 2/2023 | Langworthy | H01M 50/207 |
| 2023/0106251 | A1 * | 4/2023 | Langley | H01M 50/159<br>180/68.5 |

FOREIGN PATENT DOCUMENTS

| | | | | |
|---|---|---|---|---|
| CA | 2687046 C * | 1/2012 | | A62C 13/64 |
| CN | 107785512 A | 3/2018 | | |

* cited by examiner

*Primary Examiner* — Justin Holmes
(74) *Attorney, Agent, or Firm* — Jeremy J. Klobucar

(57) ABSTRACT

A support for a vehicle battery housing has a support body with a fastener receiving portion and a retaining portion. The fastener receiving portion has a bore and a seal. The retaining portion has a stem to secure with a reinforcement beam of the battery housing.

14 Claims, 3 Drawing Sheets

SIMPLE TWO-SIDE FASTENERS FOR VEHICLE BATTERY PACK HOUSINGS

FIELD

The present disclosure relates to automotive vehicles and, more particularly, to a support for a battery pack housing in an electric vehicle.

BACKGROUND

This section provides background information related to the present disclosure which is not necessarily prior art.

In electric vehicles, several batteries are required to power the vehicle. These batteries are generally positioned and stored in a battery pack housing. The battery pack housing generally has a base to receive the batteries with reinforcement structure as well as a cover so that when the battery pack is in the vehicle, it is entirely surrounded or covered. When designing the reinforcement for the battery pack, generally the batteries extend above the reinforcement beams. Thus, the cover is secured around the periphery of the base and may rest upon the batteries. However, this is not a desirable situation. Accordingly, it is desirable to space the cover from the battery. Thus, since the cover is secured around the periphery, during vibrations or the like, the cover may vibrate against the batteries causing noise.

Thus, it would be desirable to space the cover from the batteries to prohibit it from contacting the batteries during operation to eliminate noise and vibration effect on the cover which may lead to wearing of the cover as it rubs against the batteries. Thus, it would be desirable to having a support that spaces the cover from the battery. The present disclosure provides the battery pack housing with supports that space the cover away from the batteries inside of the housing base periphery. Thus, it is desirable to have a support that can extend from the reinforcement beams that is capable of supporting and spacing the cover. Accordingly, the present disclosure provides such supports. The supports are positioned onto the reinforcement beams and enable easy securement of the cover so that the cover is positioned from the batteries in the battery pack housing. The supports provide securement to the reinforcement beams as well as include a fastener receiving portion to receive a fastener through the cover to secure the cover to the supports.

SUMMARY

This section provides a general summary of the disclosure, and is not a comprehensive disclosure of its full scope or all of its features.

According to a first aspect of the disclosure, a support for a vehicle battery pack housing comprises a support body including a fastener receiving portion and a retaining portion. The fastener receiving portion includes a bore and a seal. The retaining portion includes a stem to secure with a reinforcement beam of the battery housing. The receiving portion includes a groove, generally circular, to retain a O-ring seal. The stem may include threads that are received within the reinforcement beam. Additionally, the fastener receiving portion bore includes threads to receive various types of screws or bolts. The fastener receiving portion is coaxial with the retaining portion. The retaining portion may include a flange to provide a pair of stems. Also, the body is of a one piece design.

According to a second aspect of the disclosure, a vehicle battery pack housing comprises a base and a cover secured to the base. A plurality of supports support the cover within the periphery of the base. Each support further comprises a support body including a fastener receiving portion and a retaining portion. The fastener receiving portion includes a bore and a seal. The retaining portion includes a stem to secure with a reinforcement beam of the battery housing. The receiving portion includes a groove, generally circular, to retain a O-ring seal. The stem may include threads that are received within the reinforcement beam. Additionally, the fastener receiving portion bore includes threads to receive various types of screws or bolts. The fastener receiving portion is coaxial with the retaining portion. The retaining portion may include a flange to provide a pair of stems. Also, the body is of a one piece design.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
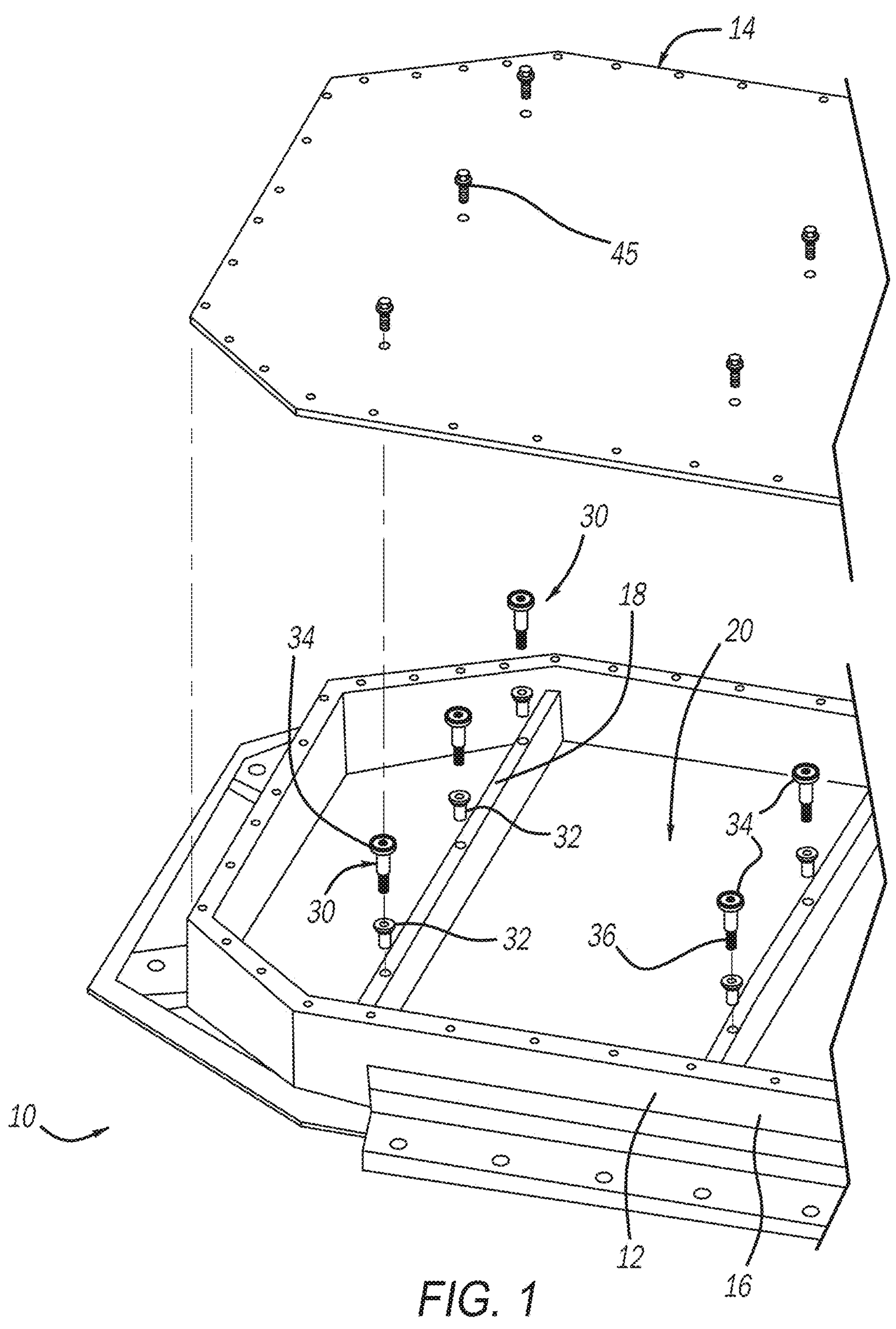
FIG. 1 is a perspective exploded view of a battery pack housing

Turning to the figures, specifically FIG. 1, a battery pack housing is illustrated and designated with the reference numeral 10. The housing includes a base 12 and a cover 14. The base 12 has an overall rectangular configuration with a surrounding wall 16. The base 12 includes one or more reinforcement beams 18 that extend laterally with respect to the housing providing pockets 20 between adjacent beams 18 to receive the batteries. Also, a plurality of supports 30 are secured with the beams 18 to support the cover 14. The supports 30 are generally positioned into the beams 18 and are retained by rivet nuts 32.

Figure 2:
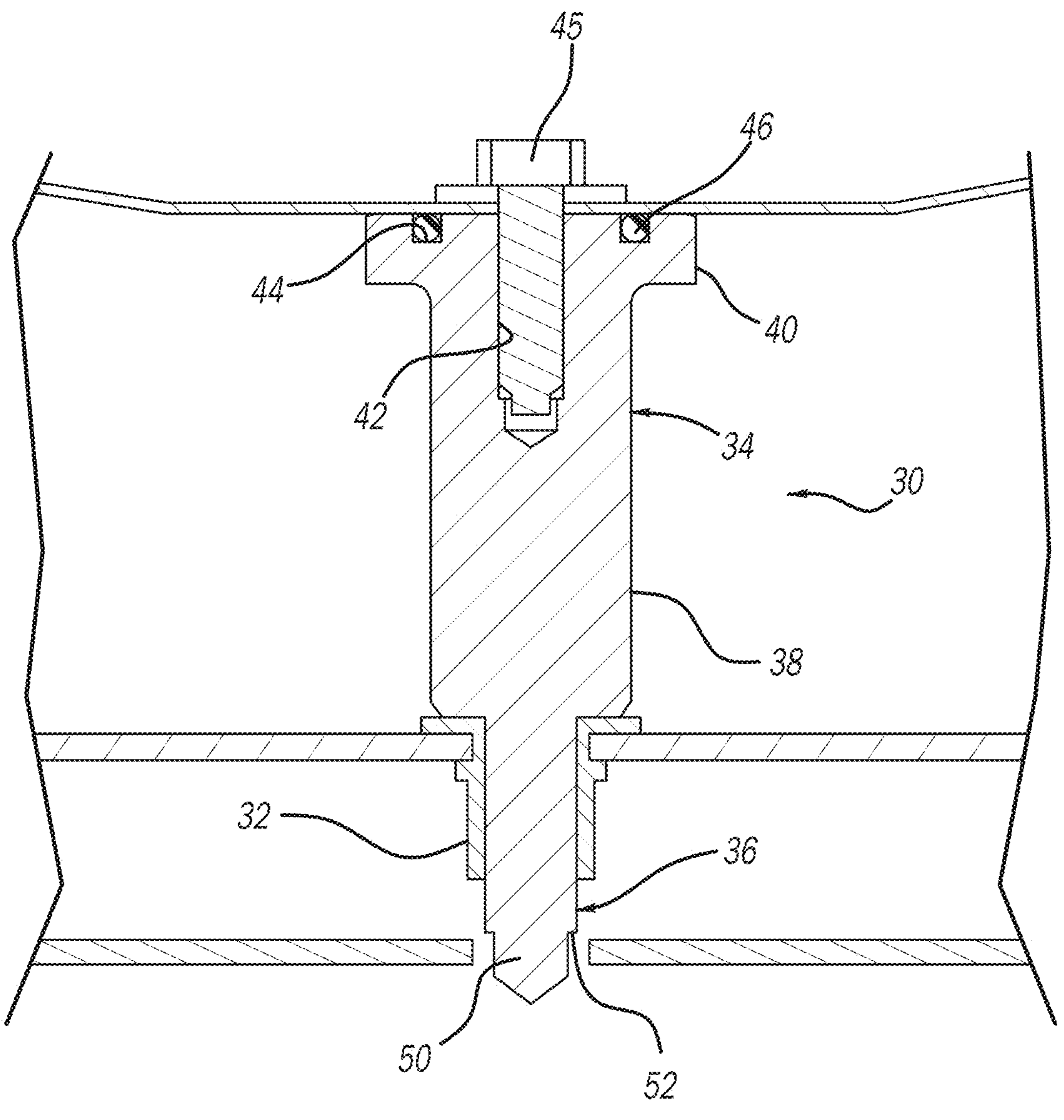
FIG. 2 is a cross-section view of the support on the battery pack housing.
Figures 3, 4:
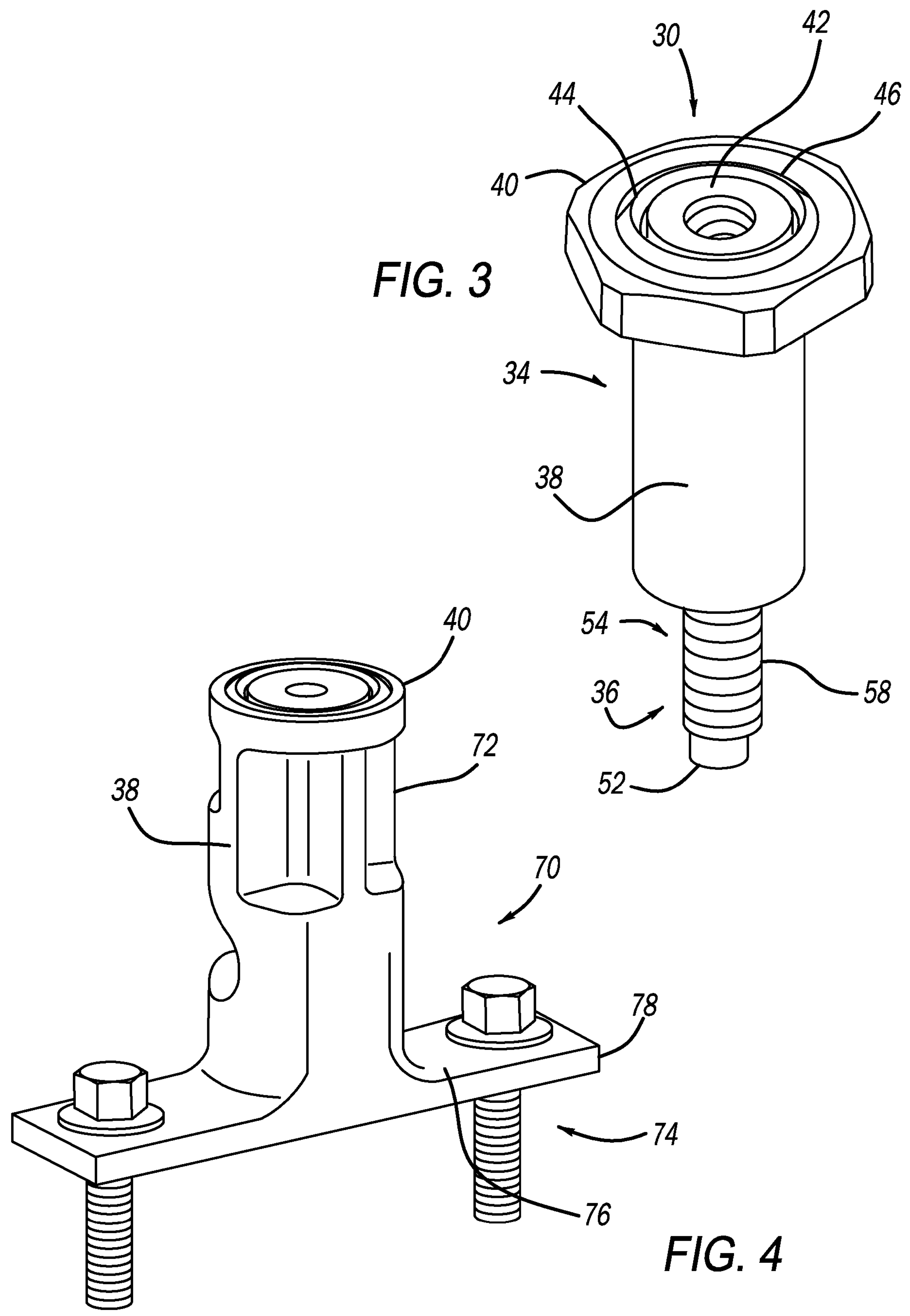
FIG. 3 is a perspective view of the support.
FIG. 4 is a second embodiment of the disclosure.

Turning to FIGS. 2 and 3, the support 30 is better illustrated. The support 30 includes a fastener receiving portion 34 and a retaining portion 36. The fastener receiving portion 34 is generally cylindrical having a cylindrical body 38 and a flange 40. The flange 40 may be circular, hexagonal or the like providing a larger surface to receive the cover 14. A bore 42 extends into the body 38. The bore 42 is threaded to receive fasteners 45 to retain the cover 14 onto the supports 30. The flange 40 includes a groove 44. The groove 44 is generally circular and includes a seal 46. The seal 46 is preferably an O-ring including an arcuate nib 48 that extends above the surface of the flange 44. Thus, when the cover 14 is secured to the supports 30, the nib 48 contacts the cover 14 and then as the fastener is tightened, the nib 48 expands providing a resilient securement of the cover 14 to the base 12.

The retaining portion 36 includes a stem 50. The stem 50 is coaxially aligned with the body 38 of the fastener receiving portion 34. Thus, this enables easy insertion of the support 30 into the rivet nut 32 on the reinforcement beam 18. The stem 50 includes a step portion 52 enabling easy insertion into the rivet nut 32. Also, the stem 50 portion may include threads 54 or the like to enhance the securement with the rivet nut 32. The support 30 may be threaded into the rivet nut 32 or forced into the nut 32. Thus, the support 30 may be easily secured with the reinforcement beam 18 providing quick and easy manufacturing while increasing speed of manufacturing and reducing costs. Also, the supports 30 provide spacing of the cover 14 with respect to the batteries to eliminating noise and rubbing of the cover 14 with respect to the batteries.

Turning to FIG. 4, a second embodiment of the disclosure is illustrated. The same reference numerals will be utilized to designate similar or the same elements. The support 70 includes a fastener receiving portion 72 and a retaining portion 74. The fastener receiving portion 72 includes a body 38 with a flange 40. The body includes a threaded bore 42, groove 44 and O-ring seal 46.

The retaining portion 74 has a flange 76 providing the support with a T-shape and includes a pair of stems 78. The stems 78 may be fasteners or the like or could be studs formed integrally with the flange 76. Thus, a pair of stems 78, which could be threaded, or inserted into rivet nuts 32 to retain the support 70 onto the reinforcement beams 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A support for a vehicle battery housing comprising:

a support body including a fastener receiving portion and a retaining portion;

the fastener receiving portion including a bore and a seal; and a rivet nut, wherein the rivet nut is configured to be seated in a reinforcement beam of a battery housing and is configured for receipt of a stem of the retaining portion of the support body.

2. The support for a vehicle battery housing of claim 1, wherein the receiving portion includes a groove to retain the seal.

3. The support for a vehicle battery housing of claim 2, wherein the seal is an O-ring.

4. The support for a vehicle battery housing of claim 1, wherein the stem includes threads.

5. The support for a vehicle battery housing of claim 1, wherein the bore includes threads.

6. The support for a vehicle battery housing of claim 1, wherein the receiving portion and retaining portion are coaxial.

7. The support for a vehicle battery housing of claim 1, wherein the body is a one piece design.

8. A vehicle battery housing comprising:

a base including a plurality of reinforcement beams;

a cover secured to the base;

a plurality of rivet nuts seated in the plurality of reinforcement beams;

a plurality of supports for supporting the cover with respect to the base, and configured to be coupled to the plurality of rivet nuts;

wherein each support further comprises a support body including a fastener receiving portion and a retaining portion;

the fastener receiving portion including a bore configured for receipt of a fastener that sandwiches the cover between the fastener and the fastener receiving portion, and a seal configured to abut the cover; and the retaining portion including a stem for securing with the rivet nuts seated with a respective reinforcement beam of the battery housing.

9. The vehicle battery housing of claim 8, wherein the receiving portion includes a groove to retain the seal.

10. The vehicle battery housing of claim 9, wherein the seal is an O-ring.

11. The vehicle battery housing of claim 8, wherein the stem includes threads.

12. The vehicle battery housing of claim 8, wherein the bore includes threads.

13. The vehicle battery housing of claim 8, wherein the receiving portion and retaining portion are coaxial.

14. The vehicle battery housing of claim 8, wherein the body is a one piece design.

* * * * *